(12) United States Patent
Todd et al.

(10) Patent No.: US 7,470,207 B2
(45) Date of Patent: Dec. 30, 2008

(54) DIFFERENTIAL ASSEMBLY FOR A MACHINE

(75) Inventors: Stephen C. Todd, Morton, IL (US); Morris E. Taft, Peoria, IL (US); Jason E. Carter, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 269 days.

(21) Appl. No.: 11/398,177

(22) Filed: Apr. 5, 2006

(65) Prior Publication Data
US 2007/0238572 A1 Oct. 11, 2007

(51) Int. Cl.
*F16H 48/06* (2006.01)
(52) U.S. Cl. .................................. 475/230
(58) Field of Classification Search ............. 475/230
See application file for complete search history.

(56) References Cited

U.S. PATENT DOCUMENTS

| | | | | |
|---|---|---|---|---|
| 2,762,240 | A | * | 9/1956 | Eckert ............... 475/234 |
| 3,955,443 | A | * | 5/1976 | Estrada ............. 475/230 |
| 4,860,614 | A | * | 8/1989 | Erdmann et al. ..... 475/246 |
| 4,864,890 | A | * | 9/1989 | Friedrich et al. .... 475/230 |
| 5,273,498 | A | * | 12/1993 | Dhillon et al. ...... 475/230 |
| 6,027,423 | A | | 2/2000 | Bell |
| 6,146,304 | A | | 11/2000 | Bendtsen |
| 6,190,281 | B1 | | 2/2001 | Oates |
| 6,361,467 | B1 | | 3/2002 | Chen |
| 6,652,408 | B2 | | 11/2003 | Rutt et al. |
| 6,692,398 | B1 | | 2/2004 | Sullivan |
| 6,743,138 | B2 | | 6/2004 | Krzesicki et al. |

\* cited by examiner

*Primary Examiner*—Dirk Wright
(74) *Attorney, Agent, or Firm*—Liell & McNeil

(57) ABSTRACT

A differential assembly for a machine includes a ring gear, first and second differential side gears and a plurality of pinions configured to mesh with the first and second side gears, and mounted on at least one pinion support pin. An inner differential housing is rotatably supported by an outer differential housing, and includes a torque transmitting hub configured to couple the ring gear with the first and second side gears via at least two pinions. The hub including a plurality of radial spokes and an outer rim portion having pinion support pin bores therein. A method of assembling a differential assembly for a machine includes coupling a spoked hub with a ring gear, and establishing a first torque transmission path between the ring gear and side gears of the differential, and establishing a second torque transmission path between a short portion of the differential housing comprising the hub and a long portion of the differential housing, the second torque transmission path including a joint coupling the short and long portions.

20 Claims, 3 Drawing Sheets

DIFFERENTIAL ASSEMBLY FOR A MACHINE

TECHNICAL FIELD

The present disclosure relates generally to differential assemblies, and relates more particularly to a differential assembly having a rotatable inner housing within an outer housing and including a spoked, torque transmitting hub.

BACKGROUND

Most wheeled work machines include a differential assembly in the machine's power train which allows the separate members of each set of wheels to rotate at different speeds. This capacity for rotation at different speeds, known in the art as "differentiation," is necessary to allow smooth turning without undue stress and wear on components of the power train, as well as the work machine's tires. When a work machine navigates a turn, wheels on the outside of the turn are typically rotated more rapidly than the wheels on the inside of the turn. A typical differential will allow at least some torque to continue to be applied to each wheel, while allowing the outer wheel to rotate more rapidly than in inner wheel during turning.

Work machine differentials may broadly be classified as "open" differentials, limited-slip differentials or locking differentials. A conventional open differential includes a ring gear configured to mesh with a drive gear, the drive gear in turn being coupled with a drive shaft of the work machine. Rotation of the ring gear via the drive gear in turn rotates a set of spider gears or pinions about a circular path. The pinions are in turn coupled with side gears connected to and rotating with first and second axle shafts of the work machine. Rotation of each axle shaft applies a torque to wheels of the work machine to propel the same. One function of the pinions is thus generally to transmit torque between the ring gear and the axle shafts, and ultimately to the wheels of the work machine. When the work machine is turning, for example, or one of the wheels encounters a slick spot in the work surface, rotation of the pinions about their mounting shafts provides a second function of allowing the axle shafts to rotate relative to one another. Despite counter-rotation of the axle shafts relative to one another, the ring gear can continue to rotate the entire set of pinions about their circular path such that the net rotation of the axle shafts is still in the same direction. In other words, while the respective axle shafts and side gears coupled therewith rotate in different directions relative to one another, the overall rotation of the axle continues to be in either a forward direction or a reverse direction, depending upon the selected transmission gear of the work machine. These general operating principles have long been known in the mechanical arts.

One known open differential design is shown in U.S. Pat. No. 6,361,467 to Chen, in particular a differential for use in an electrically powered vehicle. Chen includes a differential gear apparatus including a casing having a bearing surface for an axle. A parallel axis ring gear member is coupled with the casing, and configured to rotate a set of pinions mounted therein to in turn rotate axles of the vehicle and allow them to differentiate. The Chen configuration purportedly reduces noise and provides a steady transmission. While Chen may indeed achieve certain of its objectives, the design is limited in its robustness and overall structural integrity, making it suited to only certain applications. In particular, because the differential is often the "weak link" in a powertrain, there is often a premium on maximizing power and torque density that is not available with the Chen design.

In contrast to the design set forth in Chen, it is common in many modern differential assemblies to mount the pinions upon a member known in the art as a differential "spider." A spider typically consists of a one-piece member having a plurality of arms which serve as support shafts for the pinions. The spider is then rotatably coupled with the ring gear. In this manner, rotation of the ring gear rotates the spider and in turn transmits torque to the side gears and connected axle shafts.

Many larger work machines, for example certain off highway trucks, operate in environments and under conditions where components of the powertrain, and in particular the differential assembly, can be subjected to extremely high loads. Such loads can consist of forces transmitted along an axis of the axle shafts coupled with the differential, as well as forces oriented transverse to the axle axes, and may even include significant rotational forces acting upon various parts of the differential. In an attempt to design differentials better able to react and withstand substantial loads without significant wear and/or failure, designs have arisen wherein the internal gears, including the pinions and side gears are mounted within a rotating, supporting housing. The housing, typically including multiple housing pieces is positioned about the spider and other components, and rotatably supported within an outer housing coupled to the work machine frame.

In one design common throughout the industry, the rotatable inner housing portions are coupled together at a bolted joint. The joint often serves the dual purposes of connecting the housing portions together via a torque transmitting joint, and capturing the spider within opposed partial bores in the housing. During assembly, the housing portions may be bolted together, and the differential spider press fit therebetween in a single assembly step. Thus, the joint lies in a plane intersecting the differential spider and intersecting the axes of rotation of the pinions mounted thereon. While this approach provides a relatively easy means of assembling the differential, the attempted dual purposes of the joint, i.e. joining the housing portions and constraining movement of the spider, present a series of challenges.

In particular, to successfully couple the housing portions together and also press fit the spider into its mounting bores, the respective components of the assembly must typically be machined to relatively high tolerances. This invariably requires undesirable extra time and effort in the manufacturing process. In addition, while the dual purposes of the joint would seem to provide for ease of assembly, there are often tradeoffs in terms of overall durability and wear resistance of the differential components. This appears to be due at least in part to the fact that it is difficult to maximize the strength of the joint coupling the housing portions together without sacrificing the support function that the housing portions serve with respect to the differential spider, and vice versa.

Relatively small movements of the joint components in designs similar to the above can have the tendency to cause relatively rapid wear such as fretting in the joint faces of the bolted housing portions, the spider retention bores and surfaces of the spider itself. In certain designs, torque is transferred to the differential housing, and hence to the axle portions, via a 90° angle of the gear interface between the pinion and ring gear. This configuration can introduce wear and stress issues different from those observed with parallel axis gear interfaces for transmitting torque. While incremental improvements have been made in some instances by increasing the bolt torque of the bolted joint between the housing portions, failure and excessive wear remains a problem. In some cases, the wear can be severe enough to shorten the working life of the differential assembly, and prevent reuse of the differential components. Other challenges relating to less than optimal load capacity of portions of the differential assembly can include cracking of the rotating differential housing, retention failure of thrust plates for the side gears, thread tearing on the spider when spider retention nuts are removed, and abnormal or rapid wear on the differential gears themselves.

The present disclosure is directed to one or more of the problems or shortcomings set forth above.

SUMMARY OF THE INVENTION

In one aspect, a differential assembly for a work machine is provided, including a ring gear and a first and a second differential side gear. A plurality of pinions are configured to mesh with the first and second side gears, and are mounted on at least one pinion support pin. The differential assembly further includes an outer differential housing, and an inner differential housing rotatably supported by the outer differential housing. The inner housing includes a first housing portion and a second housing portion that includes a torque transmitting hub configured to couple the ring gear with the first and second side gears via at least two pinions mounted on the at least one pinion support pin. The hub includes a plurality of radial spokes extending inwardly from an outer rim portion having therein at least two-pinion support pin bores.

In another aspect, the present disclosure provides a wheeled work machine including a frame, a driveshaft having a drive gear, and a differential. The differential includes a ring gear coupled with the housing, the housing being rotatable relative to the frame and having positioned therein a first and a second side gear and at least two pinions configured to mesh with the side gears and mounted on at least one pinion support pin. The housing includes a first housing portion abutting and coupled via a joint with a torque transmitting hub having an outer rim portion with a plurality of pinions support pin bores therein for receipt of the at least one pinion support pin. The bores include axes lying in a common plane that is spaced from the joint.

In still another aspect, the present disclosure provides a method of assembling a differential assembly for a work machine. The method includes the step of coupling a spoked hub with a ring gear, the spoked hub comprising a short portion of a differential housing. The method further includes the step of, establishing a first torque transmission path between the ring gear and first and second differential side gears of the differential assembly, the first torque transmission path including a plurality of pinions mounted within the spoked hub. The method still further includes the step of, establishing a second torque transmission path between the short portion of the differential housing and a long portion of the differential housing, the second torque transmission path including a joint coupling of the short and long portions which is spaced from a plane shared by axes of rotation of the plurality of pinions.

DETAILED DESCRIPTION

Figure 1:
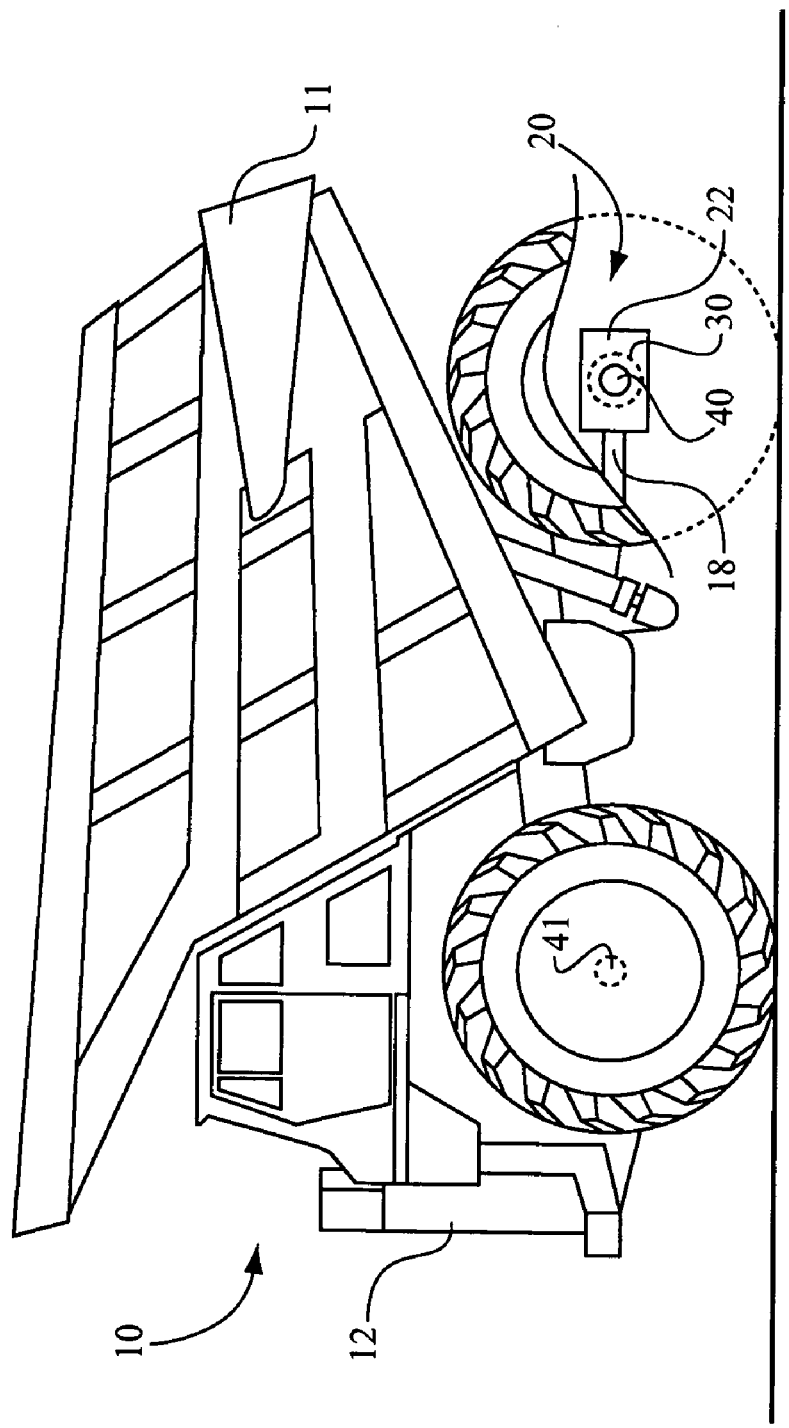
FIG. 1 is a side view of a work machine according to the present disclosure.

Referring to FIG. 1, there is shown a work machine 10 according to the present disclosure. Work machine 10 is shown in the context of an off-highway truck including a work machine body or frame 12 having rear and front axles 40 and 41 coupled therewith, respectively, and a payload bin 11. It should be appreciated, however, that a wide variety of both off-highway and on-highway work machines will benefit from the teachings of the present disclosure. Essentially any mobile, wheeled work machine having a differential assembly in the powertrain in accordance with the present disclosure may fall within its scope. Thus, such work machines as wheel loaders, scrapers, motor graders, on-highway trucks and even passenger vehicles are contemplated herein. Work machine 10 includes a driveshaft 18 coupled with a differential assembly, such as a rear differential assembly 20, having an outer differential housing 22 coupled to frame 12 and an inner differential housing 30 rotatably supported by outer differential housing 30. While a rear wheel drive work machine such as work machine 10 having a rear differential assembly is one practical implementation strategy, alternatives are contemplated. Work machines according to the present disclosure might instead be equipped with front differential assemblies, or both front and rear differential assemblies in the case of a four wheel drive machine without departing from the scope of the present disclosure. Differential assembly 20 transmits torque from driveshaft 18 to wheels of work machine 10, while allowing left and right axle shafts of rear axle 40 to rotate relative to one another, as described herein.

Figure 2:
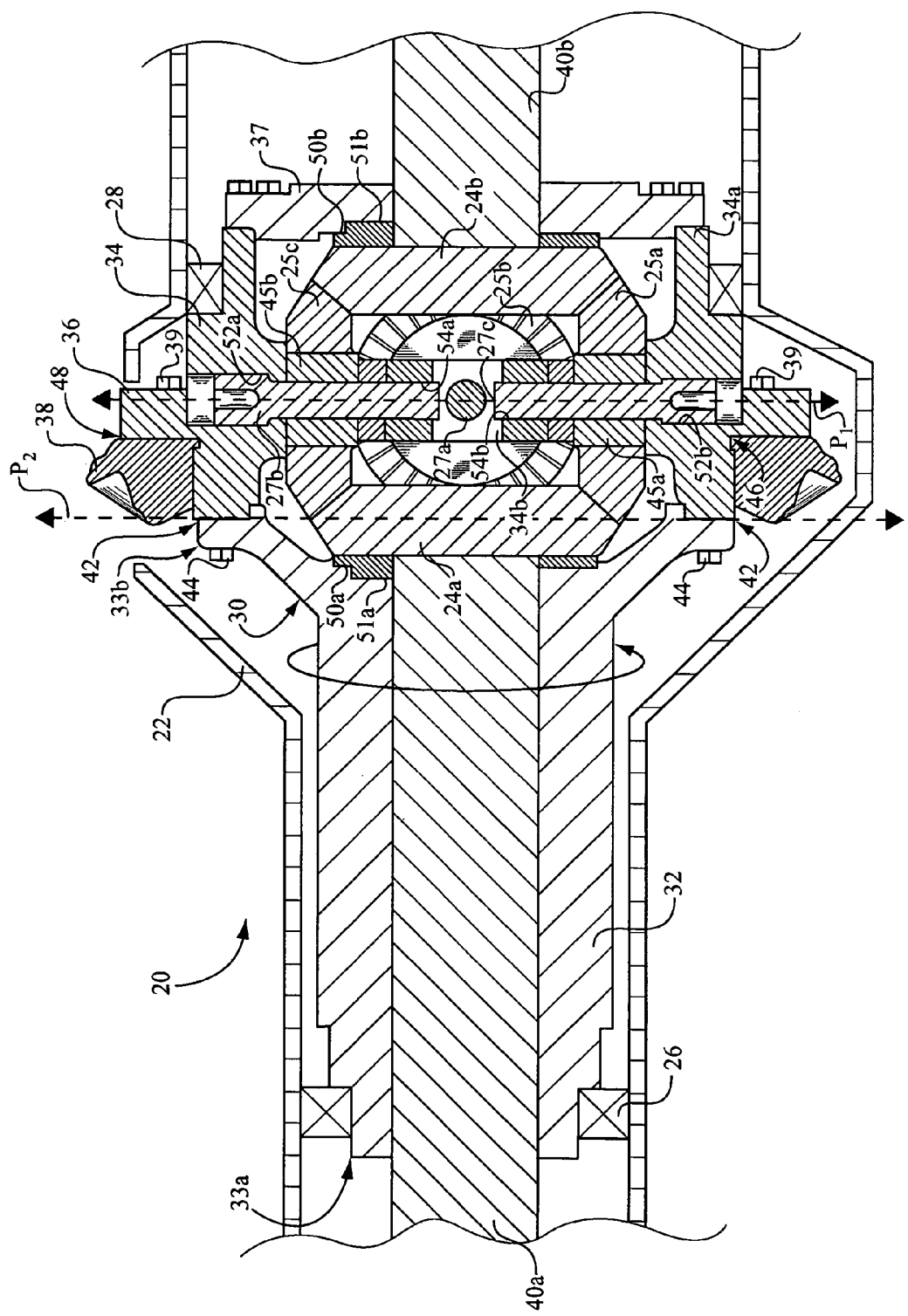
FIG. 2 is a partially sectioned side view of a differential assembly according to the present disclosure.

Referring also to FIG. 2, there is shown a partially sectioned side view of differential assembly 20, illustrating outer differential housing 22 and inner differential housing 30 rotatably mounted therein on first and second bearings 26 and 28. The illustrated bearing configuration is exemplary only, and those skilled in the art will appreciate that a wide variety of bearings and journaling designs might be implemented within the context of the present disclosure. As stated above, inner differential housing 30 is rotatable relative to outer differential housing 22, and is configured to transmit torque to first and second axle shafts 40$a$ and 40$b$, while allowing the axle shafts to differentiate. Certain conventional differential assemblies include an outer differential housing, sometimes referred to as a casing that encloses the internal components of the differential. In the present disclosure, it is contemplated that outer differential housing 22 may include a similar configuration, however, the present disclosure is not thereby limited. For example, rather than being configured as an enclosure about inner differential housing 30, outer housing 22 might consist of portions of frame 12 of work machine 10 itself. It is contemplated that in all embodiments, regardless of the chosen configuration for outer differential housing 22, it will at least partially rotatably support inner differential housing 30 and the components housed therein.

First axle shaft 40$a$ may be disposed in a long portion 32 of inner differential housing 30, whereas second axle shaft 40$b$ may be disposed in a short portion 34 thereof. It should be appreciated that in the present description "short" and "long" are used to refer to the respective parts of inner differential housing 30, but are merely intended to assign terms common in the art to components that serve functions which are familiar to those of ordinary skill. In other words, in certain embodiments, "long" portion 32 might actually be shorter in length than "short" portion/hub 34, depending upon the particular work machine and differential assembly design. Although differential assembly 20 will typically have an off-center mounting in work machine 10, as described, the present disclosure is not thereby limited, and differential assembly 20 could instead be mounted generally symmetrically about a centerline of work machine 10. Long portion 32 may include a first end 33a rotatably supported via bearing 26, and a second end 33b abutting and coupled with short portion 34 via a plurality of fasteners 44 at a bolted joint 42. Each of first and second axle shafts 40a and 40b will further typically be coupled with a toothed differential side gear 24a and 24b, respectively. Each side gear 24a and 24b may be configured to mesh with a plurality of pinion gears (hereinafter "pinions"), three of which are shown in FIG. 2, and numbered 25a, 25b and 25c. First and second annular thrust plates 50a and 50b may be positioned about axle shafts 40a and 40b adjacent side gears 24a and 24b to react thrust loads thereon. Each of thrust plates 50a and 50b may include a tab or locator projection 51a and 51b, respectively, configured to extend into complementary recesses in inner housing 30 to inhibit rotation of the respective thrust plate relative thereto.

Inner housing 30 may further include a ring member 37 positioned about axle shaft 40b, and bolted to short portion 34 opposite second end 33b of long portion 32. Thus, in cooperation with long portion 32 and short portion 34, ring member 37 provides an enclosed three-piece housing structure about the inner gear assembly of differential assembly 20, contrasting with certain earlier designs having only two housing portions. Oil may be supplied to the inside of the enclosed inner housing in a conventional manner, for example, via one or more oil ports (not shown).

It is contemplated that at least two pinions will be provided, and the number of pinions may be three, four, five, six, or greater without departing from the intended spirit and scope of the present disclosure. In one practical implementation strategy, differential assembly 20 will include four pinions (only three of which are shown in FIG. 2 due to the selected section), spaced radially about each side gear 24a and 24b and configured to simultaneously mesh with each one thereof.

Figure 3:
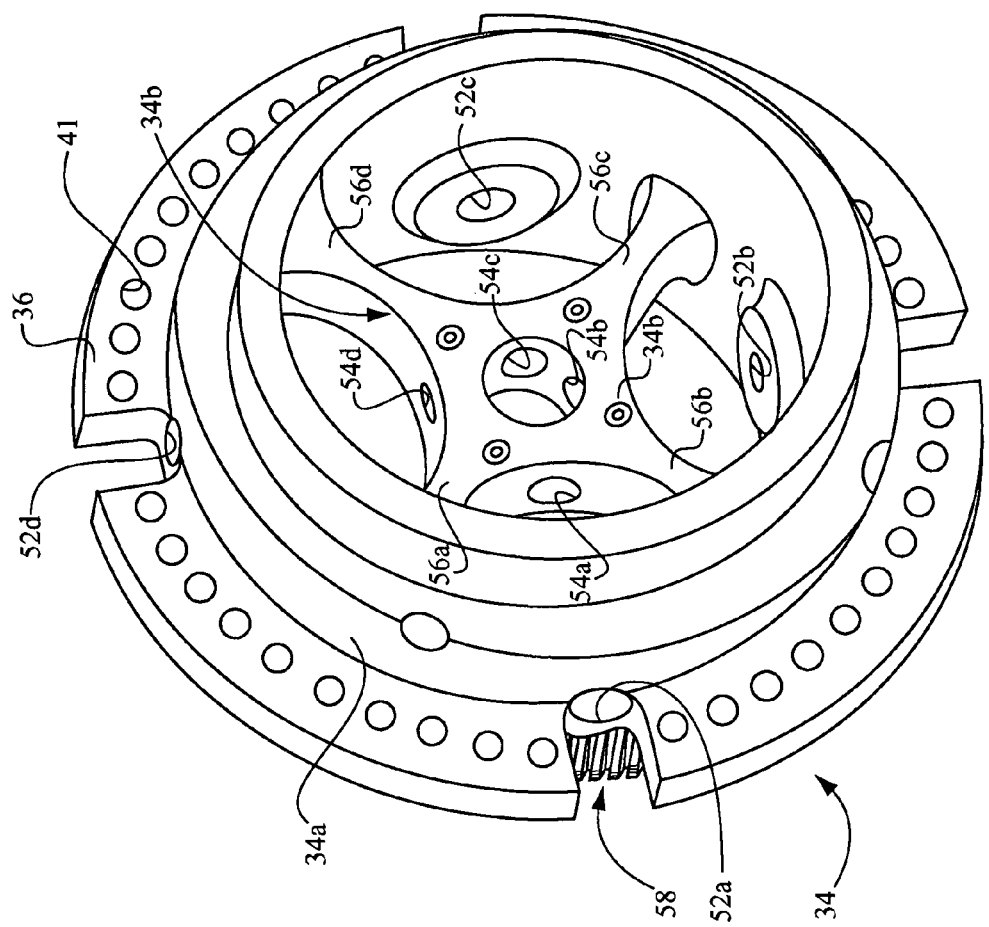
FIG. 3 is a perspective view of a spoked, torque-transmitting hub suitable for use with the differential assembly of FIG. 2.

Pinions 25a-c will typically be mounted in short portion 34 each upon a pinion support pin 27a-c, respectively. Referring also to FIG. 3, pinion support pins 27a-c will typically each be double press fit within first and second sets of bores within an outer rim portion 34a, and a center portion 34b of short portion 34 of housing 22. One, two, three, four or more pinion support pins may be used, although only three are shown in FIG. 2 due to the particular section view shown. Four pinion support pins are considered to be a practical implementation strategy, spaced radially in short portion 34. Outer rim portion 34a may include therein a plurality of radially spaced bores 52a-d whereas center portion 34b may include therein another plurality of radially spaced bores 54a-d, aligned one with each of bores 52a-d in outer rim portion 34a. In one practical implementation strategy, separate pinion support pins may be provided for each of the pinions, however, it is contemplated that an individual pinion support pin may be used for more than one pinion. For example, in an embodiment where only two pinions are used, a single pinion support pin might extend across the inner diameter of short housing portion 34 and support two separate pinions thereon. A single pinion support pin might extend completely through center portion 34b and be press fit or otherwise retained within bores in outer rim portion 34a.

Each of pinions 25a-c may further be mounted on a bushing or bearing assembly 45a, 45b, two of which are shown in FIG. 2. Bushing/bearing assemblies 45a and 45b may include bearings, a sleeve, washers and a retention nut, for example, or might simply include a single hollow cylindrical bushing in certain embodiments, or preloaded bearings configured to rotatably support the pinions without sleeves, washers or nuts. The geometry of short housing portion 34 may be tailored to appropriately locate pinion bearings without the need for additional retention and/or locating hardware. During assembly, pinion support pins 27a-c may be pressed through outer rim portion 34a, the corresponding pinions and bushing/bearing assembly positioned thereon, and pins 27a-c then pressed into center portion 34b. Such a double press fit is considered to provide a particularly robust mounting strategy for pinions 25a-c, however, other mounting/supporting techniques might be used without departing from the intended spirit and scope of the present disclosure. For example, pinion support pins 27a-c might be threadedly engaged with short portion 34, secured via a cantilever arrangement with respective to outer rim portion 34a, single press fit, welded or secured via some other technique. Short portion 34 might further be designed without center portion 34a at all, and the pinions support pins might include free floating ends disposed inwardly of outer rim portion 34a.

Referring in particular to FIG. 3, short portion 34 may comprise a torque transmitting hub for differential assembly 20, and is thus hereinafter referred to as hub 34. Hub 34 may be cast, machined or formed by some other process. As illustrated, hub 34 may include four pinion support pin bores 52a-d disposed in outer rim portion 34a, and four corresponding pinion support pin bores 54a-d disposed in center portion 34b. Hub 34 may further comprise a spoked hub, having a plurality of radial spokes 56a-d extending inwardly from outer rim portion 34a and connecting with center portion 34b. Spokes 56a-d will provide additional structural integrity to hub 34, and will typically be disposed in an alternating arrangement with each of the sets of pinions and pinion support pins positioned in hub 34. Spokes 56a-d may be formed during initial casting or machining of hub 34, or they might be separately attached thereto. In an alternative design (not shown), a free-floating center portion, without spokes might be used to support ends of the pinion support pins. Hub 34 may further include a circumferential flange 36, for example, a four-part flange, extending around the outer diameter thereof.

Returning to FIG. 2, flange 36 may include a plurality of bores therein for receipt of fasteners such as bolts 39 or dowels which in turn couple flange 36 to a toothed ring gear 38. Ring gear 38 may comprise a beveled ring gear configured to transmit torque from a drive gear to hub 34, and thenceforth to axle shafts 40a and 40b, and long portion 32 of housing 30, as described herein. Use of a beveled ring gear allows torque to be transmitted via an approximately 90° angle relative to the direction of rotation of driveshaft 18, as is typical in most differential assemblies, however, parallel axis gears might be used without departing from the scope of the present disclosure. Ring gear 38 may be coupled at a bolted joint 48 to hub 34 in part via flange 36 and fasteners 39. A snap fit interface may also be used apart from or in cooperation with the bolted joint. The snap fit interface between hub 34 and ring gear 38 may include, for example, an annular groove 46 extending about hub 34 at a base of flange 36, and a complementary annular feature extending about an inner diameter of ring gear 38. Hub 34 may also include a plurality of splines 58, shown in FIG. 3, for enhancing the mechanical locking interface with ring gear 38. Complementary, similar splines (not shown) may be formed on the inner diameter of ring gear 38. During assembly, ring gear and/or hub 34 may be heated, and the two components pressed together, engaging the snap fit interface and the splines all in one step, for example.

A plane $P_1$ is illustrated in FIG. 2 which extends generally through axes of rotation of each of pinions 25a-c, and the central axes of pinion support pins 27a-c and pinion support pin bores 52a-c and 54a-c. Plane $P_1$ lies in a torque transmission path between ring gear 38 and side gears 24a and 24b, the torque transmission path including pinions 25a-c. As the drive gear rotates against ring gear 38, torque will be transmitted via bolted joint 48 to hub 34, and in turn to the side gears 24a, 24b and axle shafts 40a, 40b via pinion support pins 27a-c and pinions 25a-c.

Another plane, $P_2$, extends through bolted joint 42 and represents a portion of a second, different torque transmission path between long portion 32 and hub 34. The second torque transmission path generally will include ring gear 38, hub 34 and bolted joint 42 where second end 33b of axle shaft 40a is positioned in abutment with hub 34. Thus, as the drive gear rotates against ring gear 38, torque will be transmitted via bolted joint 48 to hub 34, and in turn to long portion 32 via bolted joint 42.

INDUSTRIAL APPLICABILITY

Referring to the drawing Figures generally, during typical, straight-line travel of work machine 10, ring gear 38 will be rotated by the drive gear, and will in turn rotate hub 34. Rotation of hub 34 will cause the entire group of pinions 25a-c to traverse a circular path, generally without any rotation about their corresponding pinion support pins 27a-c. Movement of pinions 25a-c about the circular path will apply a torque to each of side gears 24a and 24b via the meshed gear tooth interfaces therebetween, imparting torque to axle shafts 40a and 40b, and rotating the work machine wheels to propel the same. Rotation of hub 34 will similarly apply a torque, via a different torque transmission path as described herein, to long portion 32.

Where work machine 10 is turned or one of the driven work machine wheels encounters a relatively low friction surface and begins to slip, axle shafts 40a and 40b may rotate relative to one another via a corresponding rotation of pinions 25a-c about their respective axes of rotation on bushing/bearing assemblies 45a-c. Differential rotation, or differentiation, between axle shafts 40a and 40b will take place similar to the manner of conventional open differential assemblies. Meanwhile, hub 34 will continue to apply a torque to long portion 32.

Differential assembly 20 may be subjected to various types of loads during operation. Especially in the context of a relatively large, off-highway truck as shown in FIG. 1, such loading can be relatively severe. The present disclosure provides a design and method whereby the detrimental effects of several different types of loading are ameliorated or eliminated altogether.

During operation, side loads along the axes of rotation of axle shafts 40a and 40b will be reacted at least in part via thrust plates 50a and 50b. For instance, where one of axle shafts 40a and 40b is subjected to an axial force, one of side gears 24a and 24b will tend to bear against its respective thrust plate 50a, 50b. Locator projections 51a and 51b will inhibit thrust plates 50a and 50b from rotating due to rotational forces applied during reacting of such loads. In other words, differential side gears 24a and 24b may rotate against thrust plates 50a and 50b without rotating the same under normal conditions. Loads reacted by thrust plates 50a and 50b may further be transferred to the respective housing portions 32 and 34, and transferred therebetween via bolted joint 42. Thus, bolted joint 42 may serve the purpose of not only transmitting torque between housing portions 32 and 34, but may also transmit side loads between the same.

Differential assembly 20 may also be subjected to loads that are transverse to the axes of rotation of axle shafts 40a and 40b. For example, where one work machine wheel encounters a bump or pothole, the corresponding one of the axle shafts may experience a force giving it a tendency move out of axial alignment with the other housing portion. Such loads may be thought of as giving the housing portions 32 and 34 a tendency to separate at bolted joint 42. In certain earlier designs, stresses tending to cause the bolted joint between abutting housing portions to separate slightly typically resulted in excessive wear on the abutting faces of the housing portions, the spider clamped between the housing portions, the spider retention bores, or all of the above.

As alluded to above, the torque and, hence, load-transmitting bolted joint 42 between housing portions 32 and 34 lies in a plane $P_2$ that is spaced from the common plane $P_1$ shared by the axes of rotation of each of pinions 25a-c. The spacing of the two planes allows loads on differential assembly 20 to be reacted/managed without interfering with rotation, structural integrity and support of the torque transmitting pinion and side gear assemblies within hub 34. The presently disclosed technique for separating the function of supporting/retaining the internal differential gears from the function of coupling the housing portions together can significantly reduce wear on the differential assembly components. Further, during assembly, bolted joint 42 is only needed to draw the housing portions 32 and 34 into abutment, whereas support for the pinions via the double press fit pins is achieved entirely independently. Moreover, reconfiguration of the design for supporting the pinions can in most, if not all designs allow the use of a differential spider to be abandoned altogether if desired.

Still further improvements in differential assembly working life and structural integrity are made possible by the present design. Reconfiguration of the bolted joint between housing portions, for example, allows further changes in the support structure of the ring gear as compared to certain earlier designs. In particular, the incorporation of flange 36 for coupling with ring gear 38 is made practicable. In some earlier designs, the ring gear was coupled with the long portion of the differential housing, requiring torque to be transmitted first to the long portion, then to the short portion, and finally to the pinions and side gears.

As described herein, the present design approach differs substantially from certain earlier designs wherein the torque transmitting joint between housing portions was disposed in a plane that intersected the torque transmitting pinion and side gear assembly. In such earlier designs certain loads, for example, those tending to stress the coupling between the housing portions, also had the tendency to affect the support structure, which typically included a spider, for the pinion and side gear assemblies. Such problems are ameliorated or eliminated in the present disclosure.

The present disclosure is further provided in the context of a design suitable for retrofitting certain existing work machines within existing spatial constraints. It is well known that relatively large, off-highway trucks tend to be difficult to modify due to their size and complexity, not to mention expensive to replace either in whole or in part. Only limited modification is necessary to replace an existing differential assembly with a differential assembly according to the present disclosure. Where such replacement is desirable, a short housing portion similar to hub 34 and ring 37 may be generally swapped with the short portion installed on the machine. The long portion may be shortened slightly and/or machined to provide for the desired bolted interface with the new short portion/hub. In such a retrofitting strategy, the long portion and/or axle shaft corresponding therewith may be repositioned as necessary, to ensure the associated side gear is positioned as desired to mesh with the pinions mounted within the new hub. In some instances, the bolted joint interface previously used to couple the long portion with the ring gear may be used to couple the long portion with the new hub.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For instance, while certain of the aforementioned embodiments discuss eliminating the conventional spider from the differential design altogether, the present disclosure is not thereby limited. For example, where it is desirable to continue to use a differential spider, a torque transmitting hub could be configured to support and connect with a conventional differential spider, for example, by providing retention caps for coupling the spider arms within bores in the outer rim portion of the hub. Other aspects, features and advantages will be apparent upon an examination of the attached drawings and appended claims.

What is claimed is:

1. A differential assembly for a machine comprising:
   a ring gear;
   a first and a second differential side gear;
   a plurality of pinions configured to mesh with the first and second side gears;
   at least one pinion support pin;
   an outer differential housing; and
   an inner differential housing rotatably supported by said outer differential housing and having an axis of rotation, said inner housing including a first housing portion and a second housing portion that includes a torque transmitting hub configured to couple said ring gear with said first and second side gears via at least two pinions mounted on the at least one pinion support pin, said hub including a plurality of radial spokes extending inwardly from an outer rim portion having therein at least two pinion support pin bores which include axes lying in a common plane;
   wherein the inner differential housing includes a first terminal end, a second terminal end and a length extending from the first terminal end to the second terminal end which is parallel the axis of rotation and asymmetric about the common plane.

2. The differential assembly of claim 1 wherein said first housing portion is coupled with said hub and abuts the same in a plane, and wherein each of said pinion support pin bores comprises an axis lying in a parallel, different plane.

3. The differential assembly of claim 2 wherein said first housing portion and said hub are coupled together via a bolted joint, said hub being configured to transmit torque between said ring gear and said first housing portion at least in part via said bolted joint.

4. The differential assembly of claim 3 wherein:
   said hub includes a center portion connected with each of the plurality of spokes, said center portion having therein a plurality of bores corresponding one with each of the pinion support pin bores in the outer rim portion of said hub; and
   said differential assembly further comprises a plurality of pinion support pins corresponding one with each of the plurality of bores in the outer rim portion and the plurality of corresponding bores in the center portion.

5. The differential assembly of claim 4 wherein said hub includes four spokes.

6. The differential assembly of claim 5 wherein said differential assembly comprises four pinions disposed in an alternating arrangement with said spokes and mounted on four pinion support pins each double press fit within a bore in the outer rim portion and a corresponding bore in the center portion of said hub.

7. The differential assembly of claim 6 wherein said hub comprises an outer diameter with a plurality of splines and a circumferential flange thereon, said ring gear comprising a beveled ring gear bolted to said flange and press fit onto said splines.

8. The differential assembly of claim 6 wherein:
   said outer differential housing comprises a differential casing;
   said first housing portion comprises a long housing portion, and said hub comprises a short housing portion; and
   each of said long housing portion and said short housing portion are rotatably journaled by said differential casing.

9. A wheeled machine comprising:
   a frame;
   a driveshaft having a drive gear; and
   a differential including a ring gear coupled with a housing, said housing defining an axis of rotation and being rotatable relative to said frame and having positioned therein a first and a second side gear and at least two pinions configured to mesh with said side gears and mounted on at least one pinion support pin;
   said housing including a first housing portion abutting and coupled at a joint with a torque transmitting hub having an outer rim portion with a plurality of pinion support pin bores therein for receipt of said at least one pinion support pin, said bores having axes lying in a common plane that is spaced from said joint, and wherein the housing includes a first terminal end, a second terminal end and a length extending from the first terminal end to the second terminal end which is parallel the axis of rotation and asymmetric about the common plane.

10. The wheeled machine of claim 9 comprising at least two pinion support pins each having a first end supported in one of said plurality of support pin bores in the outer rim portion of said hub, wherein said hub includes a center portion configured to support a second end of each of said at least two pinion support pins.

11. The wheeled machine of claim 10 wherein said hub comprises a spoked hub having a plurality of radial spokes extending between and connected with said center portion and said outer rim portion.

12. The wheeled machine of claim 11 wherein said hub comprises a circumferential flange configured to couple with said ring gear via a plurality of fasteners.

13. The wheeled machine of claim 12 further comprising:
   a differential casing positioned about said housing and coupled with said frame;
   a first bearing rotatably journaling said hub within said differential casing; and
   a second bearing rotatably journaling said first housing portion within said differential casing.

14. The wheeled machine of claim 13 further comprising:
   a rear axle coupled with said differential, said rear axle having a long shaft extending within said first housing portion and connected with said first side gear, and a short shaft extending within said hub and connected with said second side gear; and
   a first and a second side gear thrust plate disposed adjacent said first and second side gears, respectively, each of said thrust plates including a locator projection configured to inhibit rotation of the respective thrust plate relative to the housing of the differential.

15. The wheeled machine of claim 14 wherein:

the plurality of bores in the outer rim of said hub includes a set of four bores disposed radially symmetrically about said outer rim portion, said center portion having therein a different set of four bores aligned one with each of the bores in the outer rim portion;

the plurality of pinions of said differential includes four pinions; and the at least two pinion support pins includes four pinion support pins double press fit each within one of the bores in said outer rim portion and one of the aligned bores in the center portion of said hub.

16. A method of assembling a differential assembly for a machine comprising the steps of:

coupling a spoked hub with a ring gear, the spoked hub comprising a short portion of a differential housing, and the differential housing further including a long portion, a first terminal end and a second terminal end;

establishing a first torque transmission path between the ring gear and first and second differential side gears of the differential assembly, said first torque transmission path including a plurality of pinions mounted within the spoked hub; and establishing a second torque transmission path between the short portion of the differential housing and the long portion of the differential housing, said second torque transmission path including a joint coupling the short and long portions which is spaced from a plane shared by axes of rotation of the plurality of pinions, and the plane being located a first distance from the first terminal end and located a second, different distance from the second terminal end.

17. The method of claim 16 wherein the differential housing is an inner differential housing, the method further comprising the step of rotatably supporting the inner differential housing within an outer differential housing mounted to a frame of the machine.

18. The method of claim 17 further comprising the step of:

positioning a plurality of pinion support pins in the hub, including pressing the pins into sets of two bores each including a bore in the outer rim portion and a bore in a center portion of the hub connected to the outer rim portion via a plurality of spokes;

wherein the step of coupling the spoked hub with the ring gear comprises bolting the ring gear to a flange on the hub.

19. The method of claim 18 further comprising the step of replacing a short portion of another differential housing of the machine with the spoked hub, prior to the step of coupling the ring gear therewith.

20. The method of claim 19 wherein:

the step of establishing a first torque transmission path further comprises positioning four pinion support pins having four pinions mounted thereon within the hub; and the step of establishing a second torque transmission path further comprises positioning an end of the long portion of the differential housing in abutment with the short portion, and bolting the long portion and the short portion together at the joint.

* * * * *